US009436490B2

United States Patent
Lin et al.

(10) Patent No.: US 9,436,490 B2
(45) Date of Patent: Sep. 6, 2016

(54) SYSTEMS AND METHODS FOR TESTING WAAS PERFORMANCE FOR VIRTUAL DESKTOP APPLICATIONS

(71) Applicant: Cisco Technology, Inc., San Jose, CA (US)

(72) Inventors: Hongping Lin, Cupertino, CA (US); Elisa Caredio, San Jose, CA (US); Solomon Thiruvarutselvan Lucas, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 168 days.

(21) Appl. No.: 14/153,966

(22) Filed: Jan. 13, 2014

(65) Prior Publication Data

US 2015/0199207 A1    Jul. 16, 2015

(51) Int. Cl.
*G06F 9/44*    (2006.01)
*G06F 9/455*   (2006.01)
*H04L 12/24*   (2006.01)
*H04L 12/26*   (2006.01)
*G06F 11/34*   (2006.01)

(52) U.S. Cl.
CPC ....... *G06F 9/45533* (2013.01); *H04L 41/5038* (2013.01); *H04L 43/062* (2013.01); *H04L 43/50* (2013.01); *G06F 11/3414* (2013.01); *G06F 11/3457* (2013.01); *G06F 11/3495* (2013.01); *G06F 2201/815* (2013.01); *G06F 2201/875* (2013.01)

(58) Field of Classification Search
None
See application file for complete search history.

(56) References Cited

U.S. PATENT DOCUMENTS

| | | | | |
|---|---|---|---|---|
| 5,440,719 A | * | 8/1995 | Hanes | G06F 11/3447 703/21 |
| 6,343,365 B1 | * | 1/2002 | Matsuzawa | G01R 31/318586 365/201 |
| 6,822,947 B2 | * | 11/2004 | Sawyer | H04L 12/2602 370/328 |

(Continued)

OTHER PUBLICATIONS

Joint Cisco and VMware Solution for Optimzing Virtual Desktop Delivery, Data Center 3.0: Slutions to Accelerate Data Center Virtualization, published by Cisco/VMware, 2008, pp. 1-19.*

(Continued)

*Primary Examiner* — Tuan Q. Dam
*Assistant Examiner* — Zheng Wei
(74) *Attorney, Agent, or Firm* — Meunier Carlin & Curfman LLC

(57) ABSTRACT

A computer-implemented method for simulating performance of a wide area application service (WAAS) comprises receiving network traffic statistics and properties associated with operation of a first network comprising a first number of virtual client machines and corresponding virtual server machines. The method may also comprise establishing a second virtual network comprising a second number of virtual client machines and corresponding virtual server machines, the second number being greater than the first number. The method may also comprise simulating performance of the second virtual network based on the network traffic properties associated with operation of the first virtual network.

16 Claims, 5 Drawing Sheets

(56) References Cited

U.S. PATENT DOCUMENTS

| | | | | |
|---|---|---|---|---|
| 7,100,195 | B1* | 8/2006 | Underwood | G06F 9/4443 707/999.009 |
| 7,385,936 | B2* | 6/2008 | Shipman | H04L 41/145 370/252 |
| 7,583,587 | B2* | 9/2009 | Qiu | H04L 41/145 370/216 |
| 7,669,186 | B2* | 2/2010 | Nolan | G06F 11/362 717/124 |
| 7,774,440 | B1* | 8/2010 | Bagrodia | H04L 41/0816 703/1 |
| 7,793,269 | B2* | 9/2010 | Singonahalli | G06F 11/3668 702/186 |
| 7,849,450 | B1* | 12/2010 | Rydh | G06F 11/366 717/129 |
| 8,057,235 | B2* | 11/2011 | Kuznar | G06N 3/004 434/236 |
| 8,276,127 | B2* | 9/2012 | Rydh | G06F 11/366 717/129 |
| 8,654,643 | B2* | 2/2014 | Chew | H04L 43/026 370/235 |
| 8,689,333 | B2* | 4/2014 | Aziz | G06F 9/45537 726/24 |
| 8,775,152 | B2* | 7/2014 | Carroll | H04L 41/145 703/20 |
| 8,910,129 | B1* | 12/2014 | Wilkerson | G06F 11/3664 717/131 |
| 8,914,675 | B2* | 12/2014 | Hatano | G06F 11/263 714/32 |
| 2003/0012181 | A1* | 1/2003 | The | H04L 12/1886 370/352 |
| 2003/0181210 | A1* | 9/2003 | Shipman | H04L 41/145 455/446 |
| 2004/0032857 | A1* | 2/2004 | Tannan | H04W 24/00 370/351 |
| 2004/0117474 | A1* | 6/2004 | Ginkel | H04L 41/145 709/224 |
| 2005/0204028 | A1* | 9/2005 | Bahl | H04L 41/145 709/223 |
| 2005/0289514 | A1* | 12/2005 | Hooper | G06F 11/3664 717/124 |
| 2006/0059113 | A1* | 3/2006 | Kuznar | G06N 3/004 706/45 |
| 2007/0113218 | A1* | 5/2007 | Nolan | G06F 11/362 717/124 |
| 2011/0029520 | A1* | 2/2011 | Leary | G06F 17/30085 707/737 |
| 2011/0061043 | A1* | 3/2011 | Rydh | G06F 11/366 717/131 |
| 2011/0172963 | A1* | 7/2011 | Gu | G06F 11/3495 702/182 |
| 2012/0059920 | A1* | 3/2012 | Kruglick | H04W 16/22 709/223 |
| 2013/0028105 | A1* | 1/2013 | Chew | H04L 43/12 370/252 |
| 2013/0173219 | A1* | 7/2013 | Lin | G06F 11/3409 702/186 |
| 2013/0218549 | A1* | 8/2013 | Sultan | G06F 9/45533 703/19 |
| 2013/0338990 | A1* | 12/2013 | He | G06F 17/509 703/13 |
| 2015/0331778 | A1* | 11/2015 | Bird | G06F 11/008 717/126 |

OTHER PUBLICATIONS

Aral et al., Benchmarking a Scalable and Highly Available Architecture for Virutal Desktops, publihsed by DataCore Software, 2011, pp. 1-10.*

Bajaj et al., Improving Simulation for Network Research, USC Computer Science Department Technical REport 99-702b, published on Sep. 1999, pp. 1-11.*

Cisco Virtual Desktop Infrastructure Planning and Design Service, published by Cisco System, Inc., 2010, pp. 1-6.*

Sholomon et al., Enterprise Network Testing, published by Cisco Press, 2011, pp. 1-74.*

"Citrix—Benchmarking Citrix XenDesktop Using Login Consultants VSI—Configuration Guide", published May 18, 2013.

* cited by examiner

SYSTEMS AND METHODS FOR TESTING WAAS PERFORMANCE FOR VIRTUAL DESKTOP APPLICATIONS

TECHNICAL FIELD

The present disclosure relates generally to wide area application services WAAS)network performance testing and, more particularly, to a scalable solution for evaluating WAAS performance for virtual desktop applications.

BACKGROUND

The immense growth of the Internet has spawned demand for an ever-increasing array of applications and services, many of which are distributed across systems that reside on different networks. In fact, many companies are increasingly relying on cloud computing resources to host and serve applications and services in order to leverage the flexibility, scalability, and ease of deployment offered by cloud-based technologies. While distributed- and cloud-computing environments offer unparalleled reliability and versatility, the level of service that these environments provide are highly dependent on network traffic conditions.

The dramatic growth of high speed network infrastructure has led companies to reconsider how it manages user software and hardware resources. In order to more efficiently manage end-user hardware and software costs, companies are hosting application resources via "virtual" sessions on a remote, cloud-based server. During these virtual sessions, a user logs in to a remote application server, which creates an instance of a "virtual" computer corresponding to the user. During the virtual session, the user is able to interact with the application as if it was a local application on the user's computer. When the virtual session ends, the "virtual" computer on the remote server is closed (and may be stored), and any processing resources and any software license limitations associated with the virtual session can be reallocated to other virtual sessions associated with other users.

Providing a distributed environment that is capable of remotely hosting applications and services on an ad-hoc basis has several advantages. First, because most, if not all, of the processing requirements of the application are satisfied by the host server, the user device can be relatively inexpensive, reducing costs associated with end-user hardware. In addition, because the applications are hosted at a relatively limned number of application servers, critical updates o the software can be more easily deployed than would be required if each individual user required a local application license. Furthermore, by providing a centralized infrastructure for remote access and storage of applications and services, users can access the critical applications needed to be productive from virtually any location (e.g., home, office, hotel, vacation, etc.) and using almost any device (e.g., company-issued laptop, personal tablet device, home computer, etc.).

Some applications have been developed for providing virtual desktop infrastructure and services, such as those described above. These applications are generally configured to support a relatively large number of users at any given time, and are adapted to manage the processing and communication resources necessary to ensure seamless performance for any number of users on the network. Importantly, however, the ability of these virtualization applications to effectively manage remote user access is highly dependent upon the performance and capacity of the underlying network infrastructure on which they are deployed. In order to predict how such virtualization applications will perform as a function of the number of users and existing network infrastructure, performance tests are typically required before such desktop virtualization solutions can be deployed.

Conventional testing techniques involve creating a network of end-users and servers that matches the size and scale of the desktop virtualization program that is to be deployed. This requires significant investment in hardware and software that are dedicated to the limited purpose of testing the network. Another approach involves using specialty simulation software that aims to emulate the expected network traffic and measure the resulting network performance. However, software simulation tools alone ted to inadequately emulate network behavior and can be unreliable at simulating real network traffic behavior.

The presently disclosed systems and methods for testing WAAS performance for virtual desktop applications are directed to overcoming one or more of the problems set forth above and/or other problems in the art,

DETAILED DESCRIPTION

Figure 1:
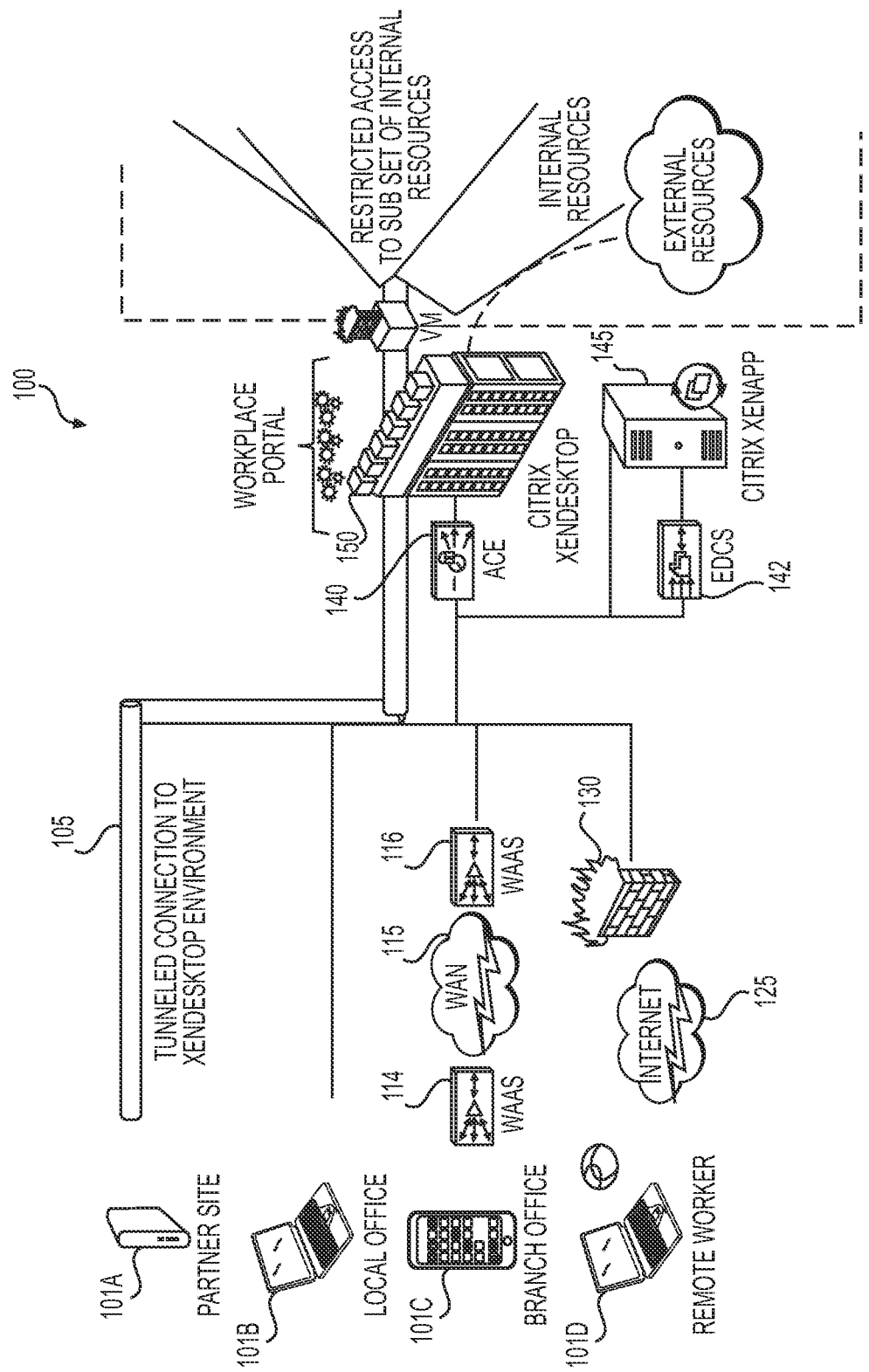
FIG. 1 provides a diagram of an exemplary cloud-based network environment in which systems and methods associated with certain disclosed embodiments may be implemented.

In accordance with one aspect, the present disclosure is directed to a method for simulating performance of a wide area application service (WAAS). The method may comprise receiving network traffic statistics and properties associated with operation of a first network comprising a first number of virtual client machines and corresponding virtual server machines. The method may also comprise establishing a second virtual network comprising a second number of virtual client machines and corresponding virtual server machines, the second number being greater than the first number. The method may further comprise simulating performance of the second virtual network based on the network traffic properties associated with operation of the first virtual network.

According to another aspect, the present disclosure is directed to a computer-implemented method for optimizing performance of a wide area application service (WAAS). The method may comprise establishing a first number of virtual client machines and corresponding virtual server machines. The method may also comprise collecting network performance statistics and a first set of traffic properties associated with data communication between the first number of virtual client machines and corresponding virtual server machines. The method may further comprise configuring a traffic simulator for a second number of virtual client machines and corresponding virtual server machines based on the first set of traffic properties associated with data communication between the first number of virtual client machines and corresponding virtual server machines. The configuration of the traffic simulator may involve generating, based on the first set of traffic properties associated with data communication between the first number of virtual client machines, a second set of traffic properties for the second number of virtual client machines and corresponding virtual server machines. The method may also include simulating data communication between the second number of virtual client machines and corresponding virtual server machines using the second set of traffic properties. The method may further comprise comparing network performance statistics associated with the simulated data communication between the second number of virtual client machines and corresponding virtual server machines with collected network performance statistics associated with data communication between the first number of virtual client machines and corresponding virtual server machines. The traffic simulator configuration may be updated based on the comparison.

In accordance with yet another aspect, the present disclosure is directed to a system for simulating performance of a wide area application service (WAAS). The system may comprise a database for receiving and storing network traffic statistics and properties associated with operation of a first network comprising a first number of virtual client machines and corresponding virtual server machines. The system may also comprise a processor communicatively coupled to the database. The processor may be configured to establish a second virtual network comprising a second number of virtual client machines and corresponding virtual server machines, the second number being greater than the first number. The processor may also be configured to simulate performance of the second virtual network based on the network traffic properties associated with operation f the first virtual network.

FIG. 1 illustrates an exemplary cloud-based network environment 100 in which systems and methods associated with certain disclosed embodiments may be implemented. As illustrated in FIG. 1, cloud-based network environment may be any network that allows a plurality of end-user devices 101A-101D to remotely access application services, desktop configuration, file management resources, bulk data storage, and other computing resources hosted by one or more network servers 145, 150. According to certain embodiments, end-user devices may also be granted access to one or more back-end services connected to network servers 150, such as a subset of restricted-access resources (e.g., special-purpose business software applications, like supply chain management software, product planning software, etc.), general purpose internal resources (e.g., Microsoft Word, Outlook, databases, etc.) and external resources (e.g., YouTube, Facebook, Twitter, etc.) Access to/from back-end services connected to network servers 150 may be monitored and limited through a virtual machine (VM) that includes firewall capabilities. As will be discussed below, network environment 100 may include various intermediate network communication components and systems for facilitating connection between end-user devices 101A-101D and network servers 145, 150.

Servers 145, 150 may each include a plurality of network data center equipment associated with, for example, workplace portal. Servers 145, 150 may each be configured to host a plurality of remote, virtual services for use by users at one or more end user devices 101A-101D. For example, server 145 may embody a computing device configured to provide application virtualization services for the workplace portal. According to one embodiment, server 145 may embody a network computing device or server configured with the Cirtix XenApp virtual application delivery solution that, upon receipt request for an application instance provided by one or more end user devices 101A-101D, creates a virtual machine instance associated with the end-user device. This virtual application instance provides a user associated with end-user devices 101A-101D with secure, remote access to the application using the resources available at server 145.

According to another embodiment, server 150 may include or embody a computing device (or devices) configured to provide desktop virtualization services for the workplace portal including one more end-user devices 101A-101D. According to one embodiment, server 150 may embody a network computing device or server configured with the Citrix XenDesktop virtual desktop delivery solution. Accordingly, upon receiving a request for a desktop ins c from one or more end user devices 1101A-101D, the Citrix XenDesktop virtual desktop delivery solution creates a virtual machine instance that implements a desktop environment accessible by a thin client window at the corresponding end user client devices 101A-101D.

In addition to serve 145, 150, the workplace portal may include one or more other network devices and resources, For example, one or more application control engine (ACE) modules 140 may be provided between end user devices 101A-101D and one or more of servers 145, 150. ACE module 140 may be configured as a toad balancing device for distributing network traffic across one or more distributed devices associated with servers 145, 150. This may be particularly advantageous in a distributed network environments that can scale based on network demand, such as cloud-based network environment 100 illustrated in FIG. 1.

In addition to load balancers, workplace portal may also include one or more shared storage resources and/or databases. For example, workplace portal may include an electronic document. control system (EDCS) 142 that is accessible by, or integrated within, one or more servers 145, 150. Such storage resources allow for the storage of state information associated with the desktop or application virtualization services. As such, when a remote user is disconnected from a virtual session running on one or more of servers 145, 150, the state information associated with the desktop and/or application resource that was being used by the user when the session was closed. EDCS 142 may also comprise network storage for one or more end user devices 101A-101D.

As illustrated in FIG. 1, end user devices 101A-101D may include or embody a network server or computer associated with a partner site 101A, a local office 101B, a branch office 101C, or one or more remote workers 101D. Although certain end-user devices 101A-101D are denoted by a particular device (local office 101B and remote worker 101D by a notebook computer, branch office by a smart phone or tablet device 101C, etc.) these designation are exemplary only and not intended to be limiting. Indeed, it is entirely likely that each site includes a plurality of end-users devices, of a variety of different types. For example, branch office 101C may include a number of different users, each of which uses one or more notebook and/or desktop computers, a smart phone, and a tablet device.

End-user devices 101A-101D may each be couple to network servers 145, 150 using one of a plurality of different network devices and media, According to one embodiment, partner site 101A may be communicatively coupled to network server 150 via a tunneled connection 105. This is particularly useful for establishing a connection between servers and partner sites that do not share a common network protocol. In such situations, a dedicated, tunneled connection 105 that provides a secure channel between one or more dedicated ports on server 150 and one or more dedicated ports on a server at a partner site over a public network, such as the Internet, Access by partner site 101A. to resources on server 150 is generally limited to those things that are provided at the port to ensure that third party partners are not given access to proprietary information stored at network server 150.

According to another embodiment, end user device 101B associated with a local office may be directly coupled (e.g., via Ethernet or fiber) to network servers 145, 150 via a local area network (LAN) connection. Alternatively or additionally, some end user devices, such as end user devices 101D associated with a remote worker allow a user to remotely connect to network servers 145, 150 through a secure firewall connection via the Internet 125, In such situations, the user enters network credentials to establish a secure, dedicated connected with servers 145, 150. Because these connections are discreet private channels and are relatively few in number, their network performance can be individually monitored and optimized.

According to yet another embodiment, one or more end users 101C associated with a branch office may be coupled to servers 145, 150 via a wide area network 115, such as a large private enterprise network or the Internet. In situations in which large numbers of remote client devices require access to bandwidth intensive resources (such as desktop and application virtualization services), the network traffic may be optimized using one or more wide area application service (WAAS) modules 114, 116. WAAS modules 114, 116 provide a number of policy-based network optimization services to manage the flow of traffic between end user devices 101C and servers 145, 150. Specifically, WAAS modules 114, 116 monitor the data packets as they travel across the network to maintain network performance for certain types of data, such as desktop and application virtualization solutions. The presently disclosed systems and methods for simulating network performance deals primarily with optimizing the behavior between WAAS module 114 associated with the client side of wide area network 115 and WAAS module 116 associated with die server side of wide area network 115.

Figure 2:
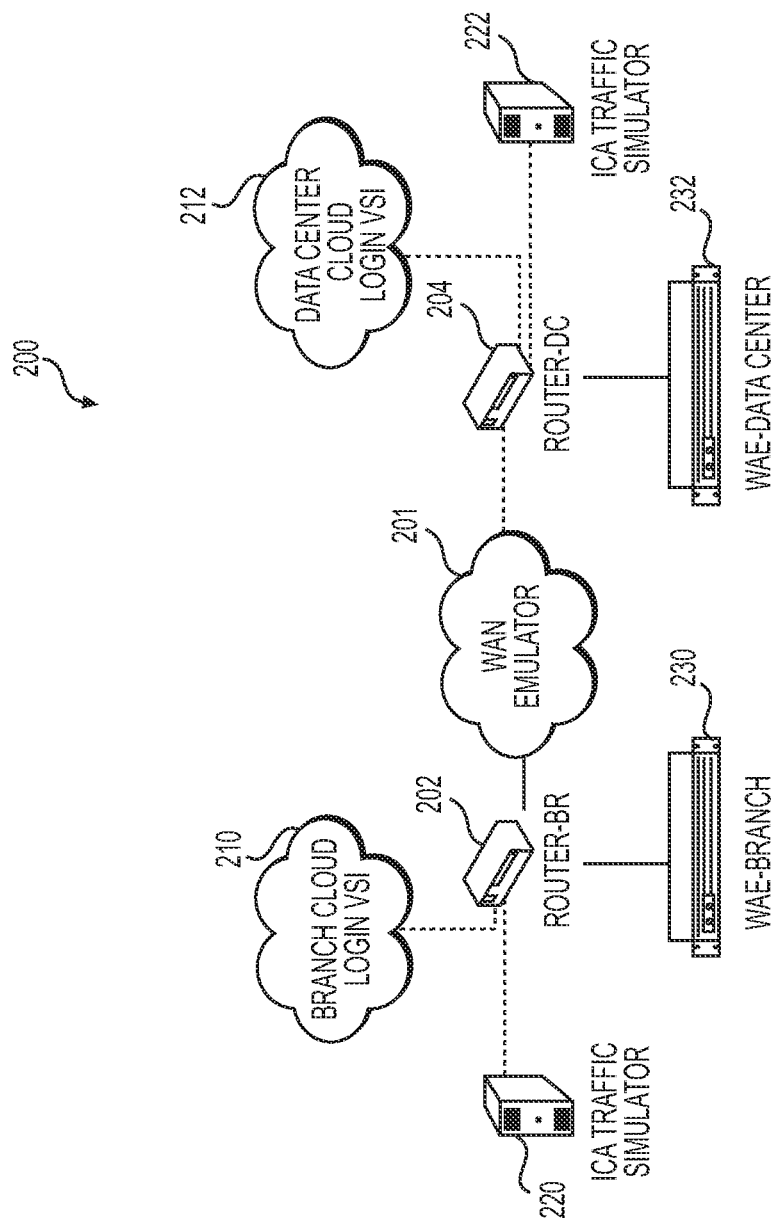
FIG. 2 provides a diagram of an exemplary simulation architecture in which certain systems and methods in accordance with the disclosed embodiments may be implemented.

FIG. 2 illustrates a simulation architecture 200 in which certain systems and methods in accordance with the disclosed embodiments may be implemented. As illustrated in FIG. 2, simulation architecture provides a platform for analyzing and enhancing performance of WAN optimization solutions, particularly those related to desktop and application virtualization services. Because desktop and application virtualization services are typically used by many users at a time, and because such virtualization schemes typically involve the primary software used by large numbers of employees, optimum performance of WAN optimization solutions are critical to the proper performance of these virtualization services.

Because network traffic associated with some services (such as desktop and application virtualization) are particularly sensitive to network latency and delays, network administrators my optimize the network traffic to ensure that such applications do not experience undue performance delays or interruptions. Optimization schemes may be provided by hardware and/or software optimization services, which may be built in to routers or may be provided by dedicated hardware or software services residing on the WAN. For example, Cisco Systems of San Jose, Calif. has designed a wide area application services (WAAS) module that is dedicated to managing network optimization solutions provided over a wide area network (WAN). Simulation architecture 200 may include a plurality of components that cooperate to accurately emulate network traffic conditions so that network optimization parameters and policies may be appropriately "tuned" to maintain optimal network performance. FIG. 2 illustrates exemplary components for simulating network and, in particular, WAAS module performance in desktop and application virtualization environments, such as those that implement Citrix XenDesktop and XenApp services.

Simulation architecture 200 may include branch (or client) and data center (or server) login VSI virtual emulators 210, 212 and branch and data center traffic simulators 220, 222 coupled to a corresponding branch and data center routers 202, 204. Branch and data center routers 202, 204 may each be communicatively coupled to one another via WAN (or WAN emulator) 201. Branch and data center wide area application engines (WAEs) 230, 232 may be coupled to respective branch and data center routers 202, 204 and may be configured to perform network optimization and application acceleration solutions. Network simulation performance statistics may be monitored at branch and. data center WAE 230, 232.

Branch and data center cloud Login VSI emulators 210, 212 may be any software product suitable for simulating respective user and data center behavior associated with Windows-based virtualized desktops. During simulation, branch and data center cloud login VSI emulators 210, 212 may be configured to simulate the branch and data center virtualized desktop behavior associated with a desired scale of the simulation. To configure the simulation, workload packets may be collected during a single LoginVSI session with medium (average) workload. The packets, as well as the timestamp are stored in the embedding database of the simulator. During the simulation phase, the packets may be specially customized with random compression blocks and re-encrypted; and sent to each peer connection in the same pace defined in the packets database.

Branch and data center traffic simulators 220, 222 may be configured to generate simulated network traffic associated with desktop and application virtualization services. According to one embodiment, branch and data center traffic simulators 220, 222 may be ICA traffic simulators configured to generate the proprietary ICA protocol user by Citrix XenDesktop virtualization software. The Cisco WAAS ICA Traffic Generator is a high performance windows application that simulates the Citrix receiver (or "client") and Citrix XenDesktop agent (or "server").

Branch and data center routers 202, 204 may be coupled to respective branch and data center cloud login VSI 210, 212 and branch and data center traffic simulators 220, 222, and may be configured to route data traffic between corresponding pairs of client and server virtual machines. Branch and data center WAE modules 230, 232 may be coupled to a respective branch and data center router 202, 204 and may be configured to handle any optimization and application acceleration tasks that may be required by the network traffic.

Processes and methods consistent with the disclosed embodiments, provide a cost effective solution for performing hybrid testing of WAAS optimization solutions, Specifically, the presently disclosed embodiments use actual network traffic parameters associated with live small-scale performance tests that have been applied to software models that simulate the behavior of different modules on the network. Such a hybrid system leverages the authenticity provided by actual performance testing data with the flexibility, speed, and cost-effectiveness associated with simulated performance testing to predict network performance in order to effective optimize WAAS parameters for client-server virtualization schemes.

Figure 3:
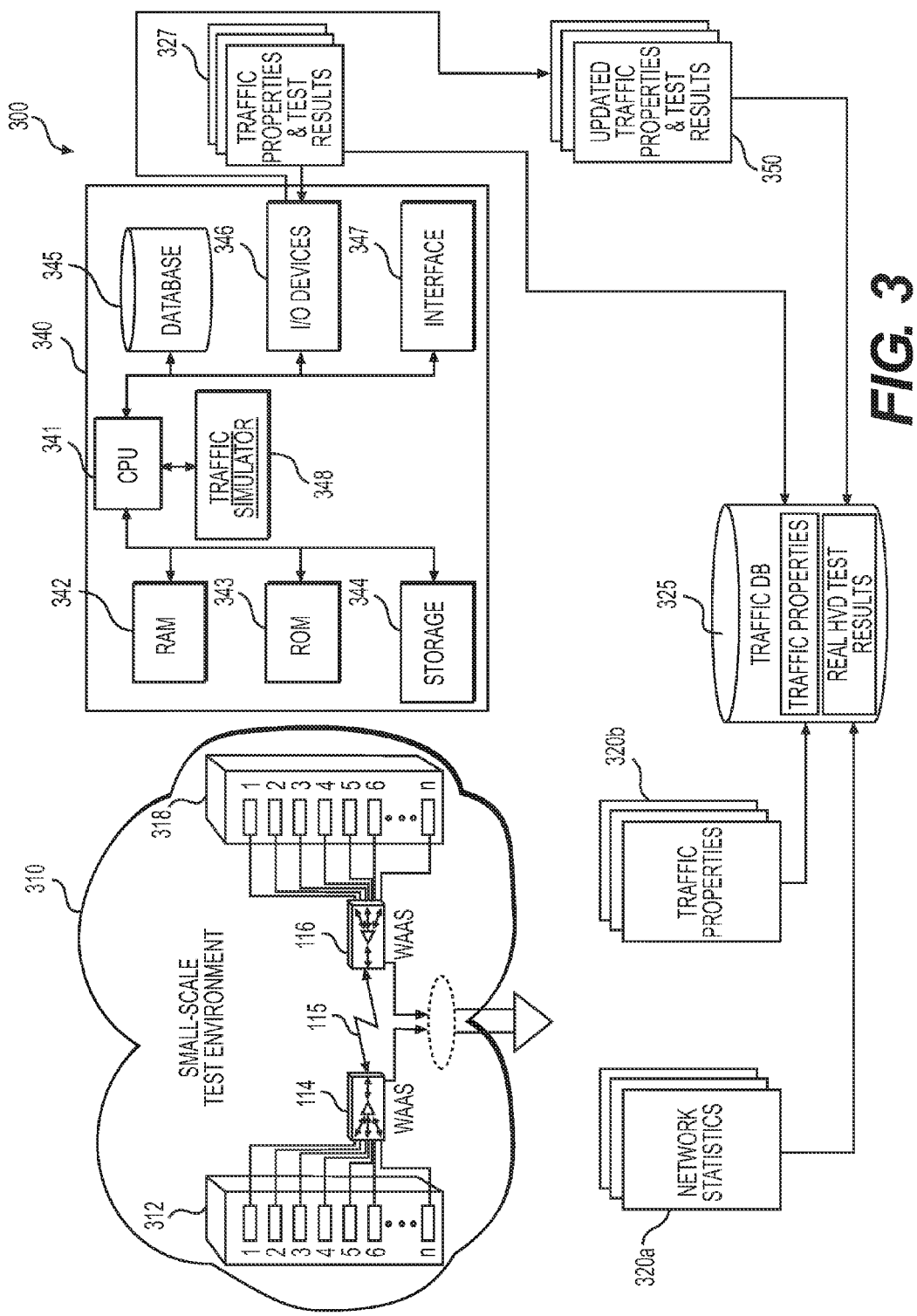
FIG. 3 provides a schematic illustration of a simulation environment, in which methods consistent with certain disclosed embodiments may be implemented.

FIG. 3 illustrates an exemplary combined schematic diagram and process flow associated with the presently disclosed environment 300 for simulating performance of WAAS optimization schemes associated with the Citrix XenDesktop service. Simulation environment 300 may include, among other things, a small-scale conventional testing environment (SCTE) 310 and a simulation test system 340. Network statistics 320a and traffic properties 320b indicative of performance of the small-scale test environment 310 may be collected and stored in a network traffic database 325. Traffic properties and test results 327 stored in network traffic database 325 may be used to configure (or calibrate) simulation test system 340 for simulating desktop and application virtualization services with large numbers of users. The updated traffic properties and test results 350 may be collected and stored in traffic database 325 in order to optimize the traffic property parameters for future simulations and establish WAAS optimization parameters when setting up a new virtualization service for a branch office.

Small-scale test environment 310 may embody a branch office environment that includes a relatively small number of client virtual machine instances (numbered 1 through "n") set up on one or more hypervisor servers 312 coupled to corresponding server virtual machine instances (numbered 1 through "n") set up on or more hypervisor servers 318 located at a data center. According to one embodiment, the client-server virtual machine pairs may be configured to run Login VSI windows-based desktop virtualization over Citrix XenDesktop virtualization service. To optimize the data flow between the branch office and data center in order to maintain performance over the network, corresponding client and server WAAS optimization services 114, 116 may be communicatively coupled via WAN 115.

During operation, small-scale test environment 310 may be monitored to evaluate network performance under actual desktop and application virtualization conditions. Network statistics 320a and traffic properties 320b may be collected and stored in a traffic database 325. These network statistics 320a and traffic properties 320b may be input into simulation test system 340 and may be scaled to generate a model of network traffic characteristics in software simulations for larger networks.

Simulation test system 340 may embody any processor-based computing system suitable for creating software models that simulate the behavior of branch and data center network operations, as well as other components and services associated with desktop and application virtualization solutions. As illustrated in FIG. 3, simulation test system 340 may include one or more hardware and/or software components configured to execute software programs, such as software for simulating virtual machines and corresponding desktop and application virtualization components associated with a computer network.

According to one embodiment, simulation test system 340 may include one or more hardware components such as, for example, a central processing unit (CPU) or microprocessor 341, a random access memory (RAM) module 342, a read-only memory (ROM) module 343, a memory or data storage module 344, a database 345, one or more input/output WO) devices 346, and an interface 347. Alternatively and/or additionally, simulation test system 340 may include one or more software media components such as, for example, a computer-readable medium including computer-executable instructions for performing methods consistent with certain disclosed embodiments. It is contemplated that one or more of the hardware components listed above may be implemented using software. For example, storage 344 may include a software partition associated with one or more other hardware components of simulation test system 340. Simulation test system 340 may include additional, fewer, and/or different components than those listed above. It is understood that the components listed above are exemplary only and not intended to be limiting.

CPU 341 may include one or more processors, each configured to execute instructions and process data to perform one or more functions associated with simulation test system 340. As illustrated in FIG. 3, CPU 341 may be communicatively coupled to RAM 342, ROM 343, storage 344, database 345, I/O devices 346, and interface 347. CPU 341 may be configured to execute sequences of computer program instructions to perform various processes, which will be described in detail below. The computer program instructions may be loaded into RAM 342 for execution by CPU 341.

RAM 342 and ROM 343 may each include one or more devices for storing information associated with an operation of simulation test system 340 and/or CPU 341. For example, ROM 343 may include a memory device configured to access and store information associated with simulation test system 340, including information for identifying and registering MAC addresses associated with network compatible devices 130. RAM 342 may include a memory device for storing data associated with one or more operations of CPU 341, For example, ROM 343 may load instructions into RAM 342 for execution by CPU 341.

Storage 344 may include any type of mass storage device configured to store information that CPU 341 may need to perform processes consistent with the disclosed embodiments. For example, storage 344 may include one or more magnetic and/or optical disk devices, such as hard drives, CD-ROMs, DVD-ROMs, or any other type of mass media device. Alternatively or additionally, storage 344 may include flash memory mass media storage or other semiconductor-based storage medium.

Database 345 may include one or more software and/or hardware components that cooperate to store, organize, sort, filter, and/or arrange data used by simulation test system 340 and/or CPU 341. CPU 341 may access the information stored in database 345 to in order to identify the port locations associated with packets addressed to incoming MAC addresses, It is contemplated that database 355 may store additional and/or different information than that listed above.

I/O devices 346 may include one or more components configured to communicate information with a component (such as traffic database 325) or user associated with simulation environment 300. For example, I/O devices 346 may include a console with an integrated keyboard and mouse to allow a user to input parameters associated with simulation test system 340. I/O devices 346 may also include a display including a graphical user interface (GUI) for providing a network management console for network administrators to configure simulation test system 340. I/O devices 346 may also include peripheral devices such as, for example, a printer for printing information associated with simulation test system 340, a user-accessible disk drive (e.g., a USB port, a floppy, CD-ROM, or DVD-ROM drive, etc.) to allow a user to input data stored on a portable media device, a microphone, a speaker system, or any other suitable type of interface device. I/O devices may be configured to output simulation results, including updated traffic properties and test results 350 to traffic database 325.

Interface 347 may include one or more components configured to transmit and receive data via a communication network, such as the Internet, a local area network, a workstation peer-to-peer network, a direct link network, a wireless network, or any other suitable communication platform. For example, interface 347 may include one or more modulators, demodulators, multiplexers, demuitiplexers, network communication devices, wireless devices, antennas, modems, and any other type of device configured to enable data communication via a communication network. According to one embodiment, interface 347 may be coupled to or include wireless communication devices, such as a module or modules configured to transmit information wirelessly using Wi-Fi or Bluetooth wireless protocols.

Figure 4:
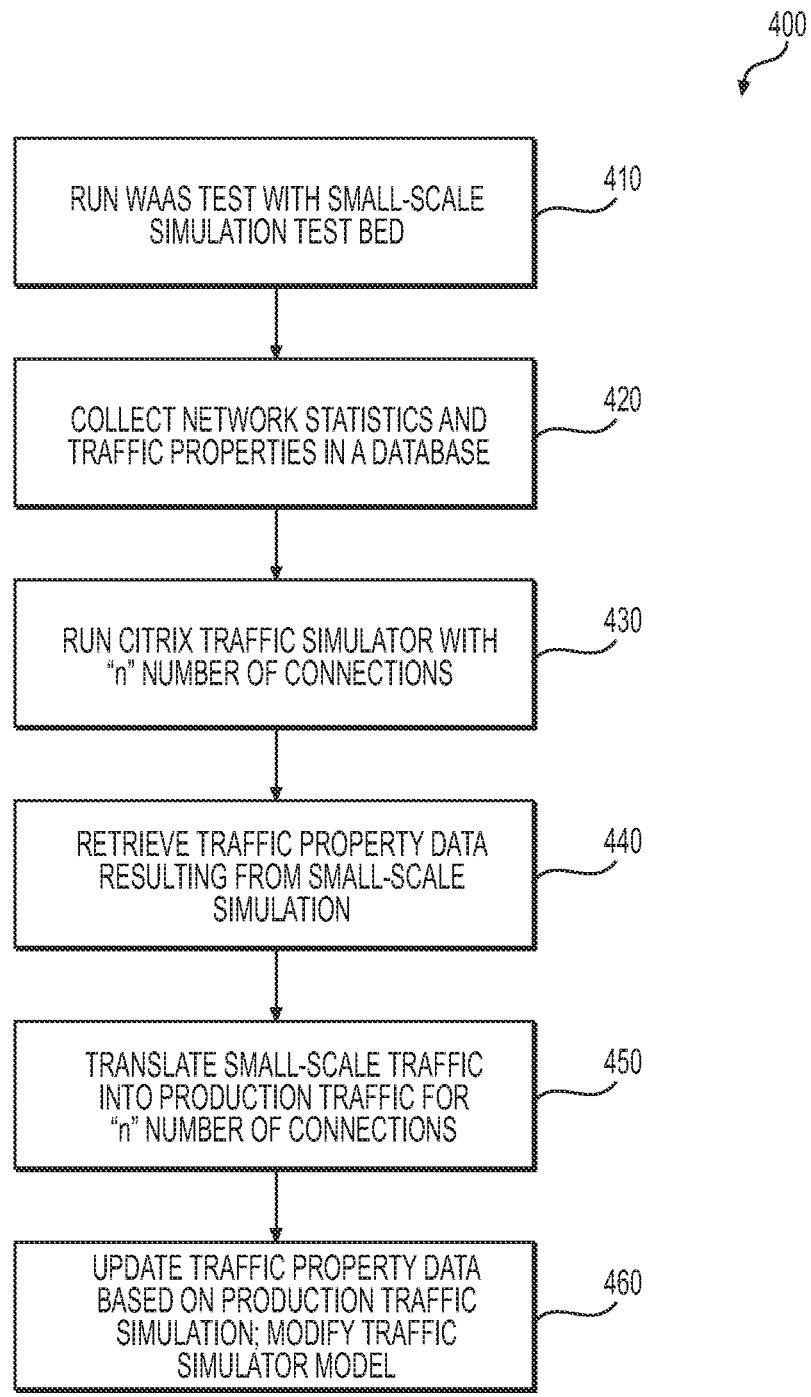
FIG. 4 provides a flowchart depicting an exemplary method for simulating performance of a wide area application service (WAS) optimization system, in accordance with certain disclosed embodiments.
Figure 5:
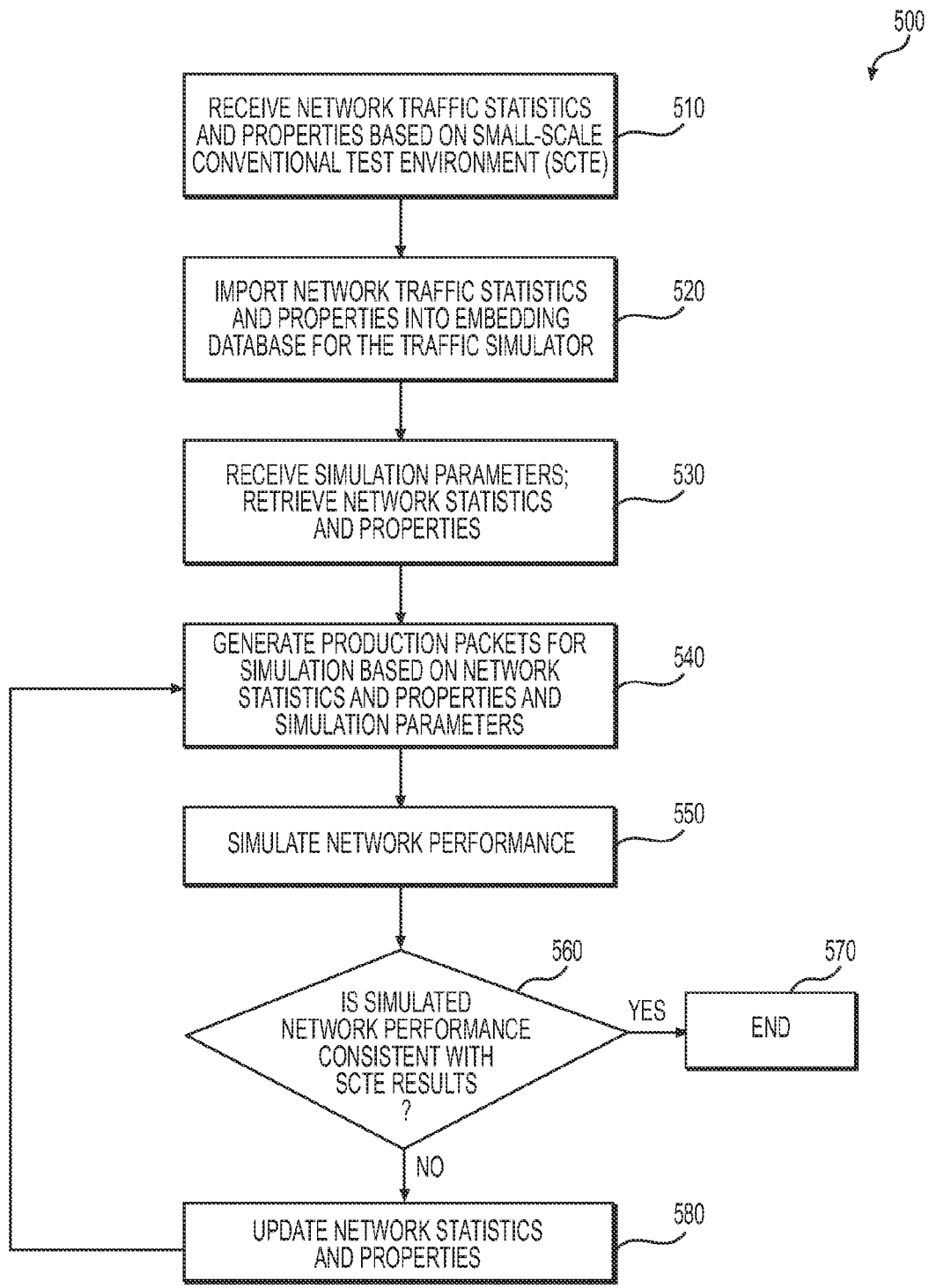
FIG. 5 illustrates a flowchart depicting an e exemplary method for simulating performance of a wide area application service (WAAS) optimization system, consistent with certain disclosed embodiments.

Processes and method consistent with the disclosed embodiments include hybrid simulation solutions that utilize authentic network traffic performance data from small-scale network tests to simulate performance of larger networks. This may be particularly advantageous prior to the construction of desktop and application virtualization infrastructure for new branch offices. Because high quality, uninterrupted, low-latency network performance is imperative to desktop and application virtualization services, it is important that network parameters and optimization solutions be accurately calibrated prior to launching the virtualization service. FIGS. 4 and 5 provide flowcharts 400 and 500, respectively, which outline alternate processes for simulating network and WAAS optimization performance for large client-server networks.

As illustrated in flowchart 400 of FIG. 4, the process may commence by running a WAAS test with a small-scale simulation test bed (Step 410). According to one embodiment, a relatively small "n" number of instances of client-server virtual machine pairs may be set up over respective client and server hypervisor servers 312, 318, similar to the configuration illustrated in small-scale conventional test environment 310 shown in FIG. 3. In order to limit costs, the number of instance may be relatively small (less than 20 virtual machines). The client-server virtual machine pairs may be coupled to one another via corresponding client and server WAAS optimization services (or modules) 114 communicatively coupled to one another via wide area network WAN 115. Client and server virtual machine pairs may be configured to handle normal Login VSI and XenDesktop traffic that would be typically of normal desktop and application virtualization services running by users at a branch office.

During operation of the WAAS test, network statistics and traffic properties associated with the test bed may be collected and stored in a traffic database (Step 420). According to the embodiment illustrated in FIG. 3, small-scale conventional test environment 310 may be coupled to a traffic database 325 using ports traffic observation ports on one or more pieces of equipment associated with the test bed 310. For example, database 325 may be coupled to a port on each of WAAS optimization module 114, 116 and configured to collected network statistics and properties at each WAAS module. The statistics and properties may be stored in traffic database 325 and eventually used to model network traffic for large-scale simulations and provide baseline performance data for comparison with large-scale simulations.

Once a sufficient sample of network statistics and traffic properties have been collected from small-scale conventional test environment, a network simulation instance comprising any number of client-server virtual machine instances may be initiated (Step 430). According to one embodiment, a user or network administrator may configure simulation test system 340 to perform a network simulation of a branch office having, for example, 1000 client-server desktop and application virtualization connections. The user may point the simulator to traffic database 325 for network traffic properties and network configuration setting as an initial starting point for the network simulations.

As part of the simulation initiation phase, network traffic properties and network configuration information from the small-scale conventional test may be retrieved (Step 440). For example, simulation test system 340 may be configured to search traffic database 325 for network configuration parameters and traffic properties associated with the small-scale conventional test performed by SCTE 310. Simulation test system 340 may import the configuration parameters into the software simulation model(s) used for simulating the different virtual network components to be used in the simulated network.

In order to accurately account for differences in the scale of the test network that was the subject of the small-scale test and the network that is to be simulated by simulation test system 340, the small-scale network traffic must be translated into production traffic for the desired number of virtual machines specified by the simulator (Step 450). For example simulation test system 340 ma be configured to transform meta packets collected from SCTE 310 into production traffic by scaling the network traffic workload to account for the difference in the number of connections between the number of connections tested in the SCTE and the number of desired connections that are to be simulated by simulation test system 340. As part of the scaling process, simulation test system 340 may use a randomization scheme to randomize the scaled data to more accurately simulate the behavior of the network.

During simulation, traffic property data and test results may be analyzed and recorded (Step 460). According to one embodiment, simulation test system 340 may be configured to upload traffic property data and analysis results 350 to traffic database 325. This data may be compared with performance data from the small-scale conventional test environment to analyze the performance of the simulated network. If necessary, the traffic simulator model (including network configuration and optimization parameters) may be adjusted to reflect any changes that may be required to improve desktop and application virtualization performance of the simulated network. Once the test results from the simulations yield acceptable network performance results, the simulated network configuration parameters may be used to set up/manage the branch office network and WAAS optimization parameters.

FIG. 5 provides a flowchart 500 illustrating an alternative approach for simulating and optimizing WAAS performance, consistent with certain disclosed embodiments. As illustrated in FIG. 5, the process may commence upon receive of network traffic statistics and properties based on small-scale conventional test environment (SCTE) (Step 510). As explained in connection with FIG. 4, this data may be based on actual network data collected from operations of a relatively small number of instances of client-server virtual machine pairs may be set up over respective client and server hypervisor servers 312, 318, similar to the configuration illustrated in small-scale conventional test environment 310 shown in FIG. 3. Client and server virtual machine pairs of the SCTE may have been indicative of normal Login VSI and XenDesktop traffic that would be typically of normal desktop and application virtualization services running by users at a branch office.

The network traffic statistics and properties associated with the small-scale conventional testing of the XenDesktop network may be imported into an embedding database (such as database 345) of simulation test system 340 (Step 530). Once imported the traffic simulator may retrieve the simulation parameters (such as the number of connections to be supported by the desired simulation network) and network statistics and traffic properties collected by the small-scale conventional test (Step 530).

Once the network traffic statistics and properties have been imported into the hybrid simulator, the simulator may generate production packets for the simulation based on the network statistics and properties, as well as the simulation parameters specific by the user (Step 540). Specifically, in order to accurately account for differences in the scale of the test network that was the subject of the small-scale test and the network that is to be simulated by simulation test system 340, the small-scale network traffic must be translated into production traffic for the desired number of virtual machines specified by the simulator. According to one embodiment, simulation test system 340 may be configured to transform meta packets collected from SCTE 310 into production traffic by scaling the network traffic workload to account for the difference in the number of connections between the number of connections tested in the SCTE and the number of desired connections that are to be simulated by simulation test system 340. As part of the scaling process, simulation test system 340 may use a randomization scheme to randomize the scaled data to more accurately simulate the behavior of the network.

The network performance may then be simulated by simulation test system (Step 550) and the simulated results may be compared with benchmark performance statistics (Step 560), such as performance results from the small-scale conventional test. If the simulated results are consistent with the desired performance of the network, the process may end and the network optimization parameters may be ready for production in a real branch office environment. If, on the other hand, the simulated network performance is unacceptable, the traffic simulator model (including network configuration and optimization parameters) may be adjusted to reflect any changes that may be required to improve desktop and application virtualization performance of the simulated network. Steps 540-580 may be iteratively repeated until the simulations yield acceptable network performance results.

It will be apparent to those skilled in the art that various modifications and variations can be made to the disclosed systems and associated methods for evaluating WAAS performance for virtual desktop applications. Other embodiments of the present disclosure will be apparent to those skilled the art from consideration of the specification and practice of the present disclosure. It is intended that the specification and examples be considered as exemplary only, with a true scope of the present disclosure being indicated by the following claims and their equivalents.

What is claimed is:

1. A method for evaluating performance of a wide area application service (WAAS), the method comprising:
    receiving network traffic statistics and properties associated with a first set of traffic flow within a first network comprising a first number of virtual client machines and corresponding virtual server machines connected therebetween through a wide area application service;
    establishing a second set of traffic flow associated with a second network, wherein the second set of traffic flow has a traffic volume associated with a second number of virtual client machines and corresponding virtual server machines connected therebetween through the wide area application service, wherein the second number is greater than the first number;
    translating the first set of traffic flow into the second set of traffic flow by scaling, based on differences of the first and second number of virtual client machines and corresponding virtual server machines;
    adjusting the second set of traffic flow associated with the second network so that the network traffic statistics and properties associated with the second set of traffic flow matches the network traffic statistics and properties associated with the first set of traffic flow; and
    testing performance of the wide area application service with the adjusted second set of traffic flow.

2. The method of claim 1, wherein the first number of virtual client machines of the first network comprises a virtual desktop network.

3. The method of claim 1, wherein each of the first set of traffic flow and the second set of traffic flow includes a login virtual session indexer (VSI) traffic pattern.

4. The method of claim 1, further comprising configuring one or more policies associated with the wide area application service based on the second set of traffic flow.

5. The method of claim 1, wherein establishing the second set of traffic flow associated with the second network includes retrieving one or more meta packets associated with the first set of traffic flow and using the one or more meta packets to generate the second set of traffic flow, wherein the second set of traffic flow includes production traffic having a volume sized based on a desired test size of the second network.

6. A computer-implemented method for setting up a test environment, wherein the test environment is used for optimizing performance of a wide area application service (WAAS), the method comprising:
    establishing a first number of virtual client machines and corresponding virtual server machines to transmit data communication through a wide area application service;
    collecting a first set of network performance statistics and traffic properties associated with the data communication through the wide area application service between the first number of virtual client machines and corresponding virtual server machines;
    establishing a second number of virtual client machines and corresponding virtual server machines to transmit second data communication through the wide area application service, the second number of virtual client machines and corresponding virtual server machines, collectively, forming a test environment for the wide area application service;
    generating, based on the collected first set of performance statistics and traffic properties, production packets to account for differences in scale of the first and second number of virtual client machines and corresponding virtual server machines for transmission between the second number of virtual client machines and corresponding virtual server machines through the wide area application service;

storing, at a database accessible to a second number of virtual client machines, the generated production packets;

cause the transmission of the generated production packets between the second number of virtual client machines and corresponding virtual server machines through the wide area application service;

collecting a second set of network performance statistics and traffic properties associated with transmission of the generated production packets between the second number of virtual client machines and corresponding virtual server machines through the wide area application service;

comparing the second set of network performance statistics and traffic properties with the first set of network performance statistics and traffic properties; and in response to the comparison, generating subsequent production packets for transmission between the second number of virtual client machines and corresponding virtual server machines through the same wide area application service until the second set of network performance statistics and traffic properties matches the first set of network performance statistics and traffic properties.

7. The method of claim 6, wherein the transmission of the generated production packets between the second number of virtual client machines and corresponding virtual server machines through the wide area application service includes a login virtual session indexer (VSI) traffic pattern.

8. The method of claim 6, wherein volume of the data communication associated with the second set of network performance statistics and traffic properties is larger than volume of the data communication associated with the first set of network performance statistics and traffic properties.

9. The method of claim 6, further comprising establishing WAAS optimization parameters using the generated production packets.

10. The method of claim 9, wherein establishing the WAAS optimization parameters includes establishing parameters selected from the group consisting of transport flow optimization, buffering, compression, and application-specific acceleration.

11. The method of claim 6, wherein generating the subsequent production packets for transmission between the second number of virtual client machines and corresponding virtual server machines through the same wide area application service includes using meta packets associated with the data communication between the first number of virtual client machines and corresponding virtual server machines.

12. A system for setting up a test environment for testing a wide area application service (WAAS), the system comprising:

a database for receiving and storing network traffic statistics and properties associated with a first set of traffic flow within a first network comprising a first number of virtual client machines and corresponding virtual server machines connected therebetween through a wide area application service; and a processor, communicatively coupled to the database and configured to:

establish a second set of traffic flow associated with a second virtual network, wherein the second set of traffic flow has a traffic volume associated with a second number of virtual client machines and corresponding virtual server machines connected therebetween through the wide area application service, wherein the second number is greater than the first number;

translate the first set of traffic flow into the second set of traffic flow by scaling, based on differences of the first and second number of virtual client machines and corresponding virtual server machines; and adjust the second set of traffic flow associated with the second virtual network so that the network traffic statistics and properties associated with the second set of traffic flow matches the network traffic statistics and properties associated with the first set of traffic flow.

13. The system of claim 12, wherein the first network comprises a virtual desktop network.

14. The system of claim 13, wherein each of the first set of traffic flow and the second set of traffic flow includes a login virtual session indexer (VSI) traffic pattern.

15. The system of claim 12, wherein the processor is further configured to configure one or more policies associated with the wide area application service based on the second set of traffic flow.

16. The system of claim 12, wherein establishing the second set of traffic flow associated with the second virtual network includes retrieving one or more meta packets associated with the first set of traffic flow using the one or more meta packets to generate the second set of traffic flow, wherein the second set of traffic flow includes production traffic having a volume sized based on a desired test size of the second virtual network.

* * * * *